(12) United States Patent
Karunakaran et al.

(10) Patent No.: US 9,247,293 B2
(45) Date of Patent: Jan. 26, 2016

(54) SYSTEM AND METHOD FOR MULTI-STANDARD BROWSER FOR DIGITAL DEVICES

(71) Applicant: Infosys Limited, Bangalore (IN)

(72) Inventors: Siva Sakthi Ganesan Karunakaran, Chennai (IN); Varadarajan Aravamudhan, Chennai (IN); Narayan Balasubramanian, Chennai (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 14/320,288

(22) Filed: Jun. 30, 2014

(65) Prior Publication Data

US 2015/0074736 A1   Mar. 12, 2015

Related U.S. Application Data

(62) Division of application No. 13/437,468, filed on Apr. 2, 2012, now Pat. No. 8,799,974.

(30) Foreign Application Priority Data

Dec. 12, 2011 (IN) .......................... 4312/CHE/2011

(51) Int. Cl.
| | | |
|---|---|---|
| H04N 7/173 | (2011.01) | |
| H04N 21/443 | (2011.01) | |
| H04N 21/4782 | (2011.01) | |
| H04N 21/2665 | (2011.01) | |
| H04N 21/462 | (2011.01) | |
| H04N 21/472 | (2011.01) | |

(52) U.S. Cl.
CPC ....... *H04N 21/4431* (2013.01); *H04N 21/2665* (2013.01); *H04N 21/443* (2013.01); *H04N 21/4622* (2013.01); *H04N 21/472* (2013.01); *H04N 21/4782* (2013.01)

(58) Field of Classification Search
USPC ........................................ 725/110, 100, 114
See application file for complete search history.

(56) References Cited

U.S. PATENT DOCUMENTS

| | | | |
|---|---|---|---|
| 2003/0229900 A1* | 12/2003 | Reisman ........... | G06F 17/30873 725/87 |
| 2004/0176958 A1* | 9/2004 | Salmenkaita et al. ........ | 704/275 |
| 2008/0196079 A1* | 8/2008 | Lee et al. ..................... | 725/139 |

* cited by examiner

*Primary Examiner* — Nnenna Ekpo
(74) *Attorney, Agent, or Firm* — Marc S. Kaufman; Mark T. Vogelbacker; Reed Smith LLP

(57) ABSTRACT

The present invention provides a method of rendering a thin client application in a network device, for parsing the internet data so as convert the internet data into a common data format which can be rendered in set-top box using any type of middleware. The invention would be equipped to handle any type of application and also would be cost-efficient to be developed in a middleware layer of a network device like set-top box.

14 Claims, 5 Drawing Sheets

SYSTEM AND METHOD FOR MULTI-STANDARD BROWSER FOR DIGITAL DEVICES

RELATED APPLICATION DATA

This application is a divisional of application Ser. No. 13/437,468, filed Apr. 2, 2012 (now pending), which claims priority to Indian Patent Application No. 4312/CHE/2011, filed Dec. 12, 2011, the disclosures of which are hereby incorporated by reference in their entirety.

TECHNICAL FIELD

The present invention relates to an application streaming technique in a network device, and more particularly to a method and a system for effectively rendering an application in a set-top box (STB), which can be extended to support middleware layer standards in network devices.

BACKGROUND

Internet browsing can be experienced in many digital devices now-a-days, moving away from the conventional method of browsing internet through a computer. Though the extension of Internet browsing to digital devices is fast paced, rendering a browsing technique in such digital devices becomes cumbersome, since Internet browsing is not the primary functionality of the digital devices.

A middleware layer in a network device, such as set-top box (STB), provides a conducive platform for developing applications that can be displayed on a broadcasting-receiving apparatus such as a television. The network device can exist standalone, like STB, or be a part of the televison. In one instance, an application for the television is deployed in the STB. The application may be a thick client application or a thin client application. Typically, thick client applications may be developed in two ways, viz. by means of a development STB provided by middleware vendors or by means of an emulator on a computer which can emulate similar environmental conditions as that of the STB. The traditional method of developing an application using the development STB provided by the middleware vendor is expensive due to the cost incurred for buying the development STB. The latter method of emulating the STB environment in the computer to develop applications is a more viable option.

Commercial emulators available for the purpose of emulating the STB environment are priced at par with the development STB offered by the middleware vendors. Although emulating STB environment in the computer and developing the application is easy for the developer, the available emulators offer a spectrum of functionalities that may be exclusive.

In light of the discussion above, a browser that can help in migrating applications from being thick client to thin client would be desirable. This would, in turn, provide more flexibility such as enabling any type of existing application to be rendered in the STB. Also, existing browsers have inherent problems in developing an application supporting different input types such as Hypertext Markup Language (HTML), Extensible Hypertext Markup Language (XHTML) along with displaying the corresponding elements in different output toolkits.

Thus, existing mechanisms used for rendering browsing techniques in a network device which is displayed on a broadcasting-receiving apparatus have inherent problems as discussed above. Further, developing and deploying the digital application with all the advantages increases the costs. Accordingly, there is a need for developing and deploying the digital application in network devices, which should be supported by any type of middleware.

SUMMARY OF THE INVENTION

The present invention provides a method of developing a multi-standard compatible browser in a network device, which parses the Internet data and converts the data into a common data format that can be rendered in a set-top box (STB) using any type of middleware.

In one embodiment of the present invention, a computer implemented method for streaming data in the network device is detailed. The method comprises sending a request to the server for obtaining data, and parsing the received data so as to break the received data into individual components. The individual components are mapped into a common data format. Subsequently, the data is mapped into components of middleware in the network device so that it can be displayed in a broadcasting-receiving apparatus.

In another embodiment of the present invention, as a part of rendering the browser in the network device, the received data is mapped into a format that can be understood by middleware employed in the network device.

The invention proposes rendering of the thin client application in the network device thereby reducing the workload on the client. This is desirable for streaming applications in the network device. Also, the invention can be provided as an independent service which can be utilized by other applications.

BRIEF DESCRIPTION OF THE DRAWINGS

The above mentioned features as well other features, aspects, and advantages of the present invention will become better understood when the following detailed description is read with reference to the accompanying drawings in which like characters represent like parts throughout the drawings, wherein.

DETAILED DESCRIPTION

The following description is full and informative description of the best method and system presently contemplated for carrying out the present invention, which is known to the inventors at the time of filing the patent application. Of course, many modifications and adaptations will be apparent to those skilled in the relevant arts in view of the following description, in view of the accompanying drawings and the appended claims. While the system and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

Figure 1:
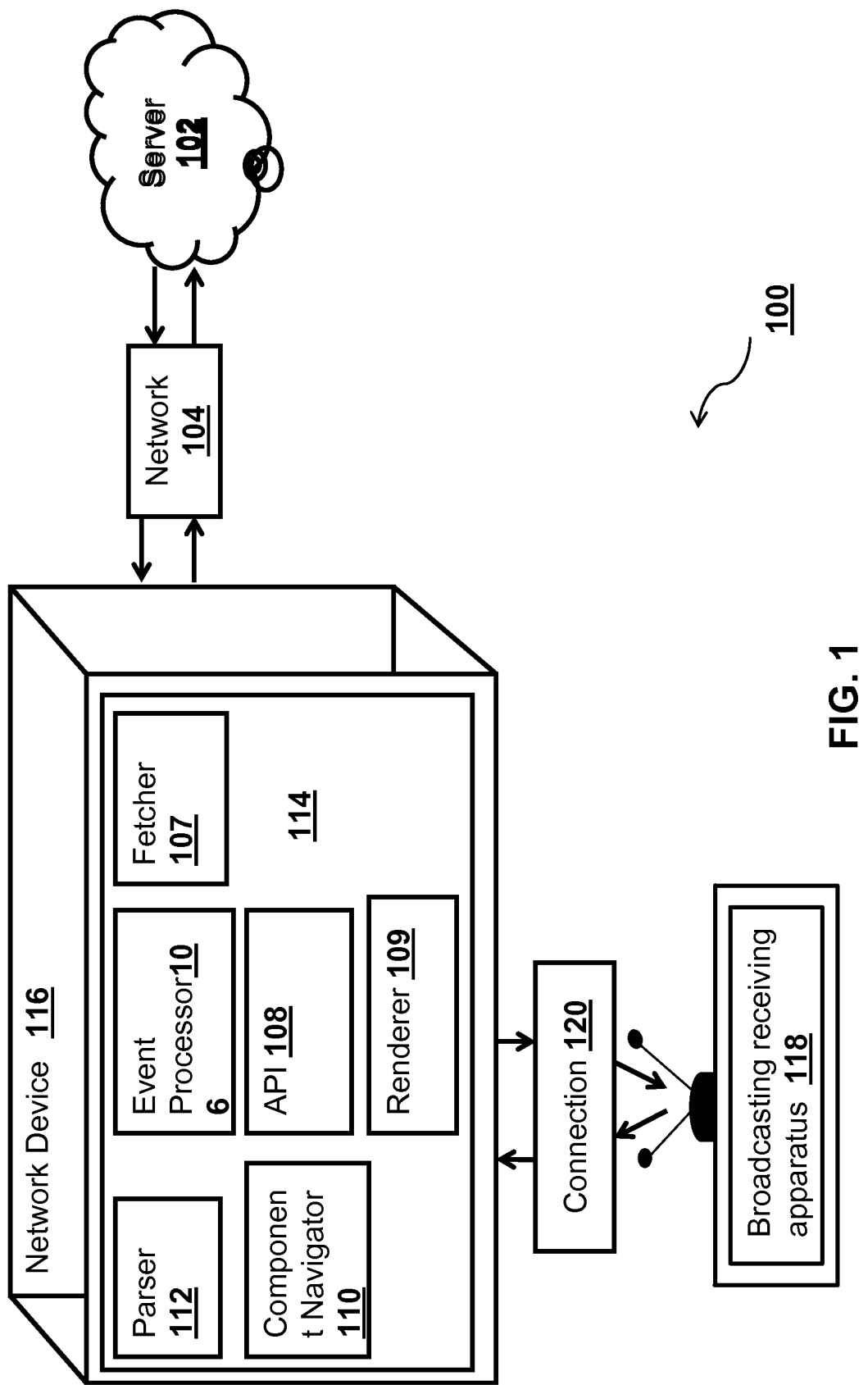
FIG. 1 is a block diagram illustrating various modules of a multi-standard browser rendered in a network device, according to one embodiment of the present invention.

FIG. 1 is a block diagram of a system 100 illustrating a multi-standard browser rendered in network device 116, according to one embodiment of the present invention. System 100 comprises at least one of network device 116, a parser 112, a renderer 109, a fetcher 107, a component navigator 110, an application programming interface (API) 108, and a broadcasting-receiving apparatus 118. Parser 112, renderer 109, fetcher 107, component navigator 110 and API 108 form deployment module 114 of the system.

In accordance with an embodiment, network device 116 contains a middleware (not shown in the figure), which is used for developing interactive applications such as web browser application which can be displayed in the broadcasting-receiving apparatus 118, such as a television. Deployment module 114 is placed within the middleware, which in turn, is present in network device 116. The middleware in network device 116 enables the interactivity of system 100.

Fetcher 107 sends a request for data through network 104. In an embodiment, fetcher 107 may also monitor network 104 for data without explicitly sending a request. Server 102 may be employed to pass the data whenever requested by fetcher 107 through network 104. It should be noted that server 102 may also send data to the fetcher without receiving a request from the fetcher. Network 104 may be one of a public, a private and a hybrid network as per one embodiment of the present invention. As will be understood, the public network is a network which can be configured with public Internet Protocol and is visible to devices in another network such as the Internet. The private network is a network in which devices are not visible to any outside network. The hybrid network is a combination of the public and private networks. Further, the network may belong to a medium consisting at least one of a satellite, terrestrial, wired or an Internet broadcasting medium.

Renderer 109 maps the data in common data format to any specific STB middleware component.

Component navigator 110 is used for the purpose of navigating between the components rendered in the user interface of the application. In an embodiment, an algorithm is used for linear navigation of the components which is managed by component navigator 110.

Application programming interface (API) 108 processes the received declaratives. API 108 hosts the middleware (not shown in the figure). It should be noted that API 108 is capable of exposing the functionality of every component of the present invention individually. Exposing the functionalities allows the invention to use other services to enhance system 100. Additionally, API 108 facilitates the integration of other mapping mechanisms, such as an independent mapping system, which may prove useful to existing systems.

Broadcasting-receiving apparatus 118 receives a broadcasted signal from connection 120. The connection may be one of Composite Video, Component Video, High-Definition Multimedia Interface (HDMI), Video Graphics Array (VGA), or any such similar connection.

Event processor 106 maps the application or user events from one communication protocol to another. In an embodiment, the application or the user events of any user interface components in an Internet browser format, such as Hypertext Markup Language (HTML), are mapped to corresponding Home Audio Video Interoperability (HAVi) event using a mapping table (not shown), which may be referred to as 'browser callback'.

Network device 116 receives data from server 102 through network 104. It should be noted that this data may be either synchronous or asynchronous. The declaratives in the received data are split into components. The components are usually tags of Extensible Hypertext Markup Language (XHTML). Parser 112 converts these XHTML tags into a common data format. This data in common data format components is mapped to corresponding components in HAVi protocol, and displayed in broadcasting-receiving apparatus 118. Network device 116 receives the user response for the displayed interface. The received user input is again converted back into declaratives and received at server 102. The converted declaratives in the specific format is sent to server 102 and the cycle continues for every interaction.

In accordance with an embodiment, the user input may be received as a text input when the user is provided with input devices such as keyboard. Similarly, the user input may be received as a binary input when the user is provided with an input device such as a remote for the network device.

Figure 2:
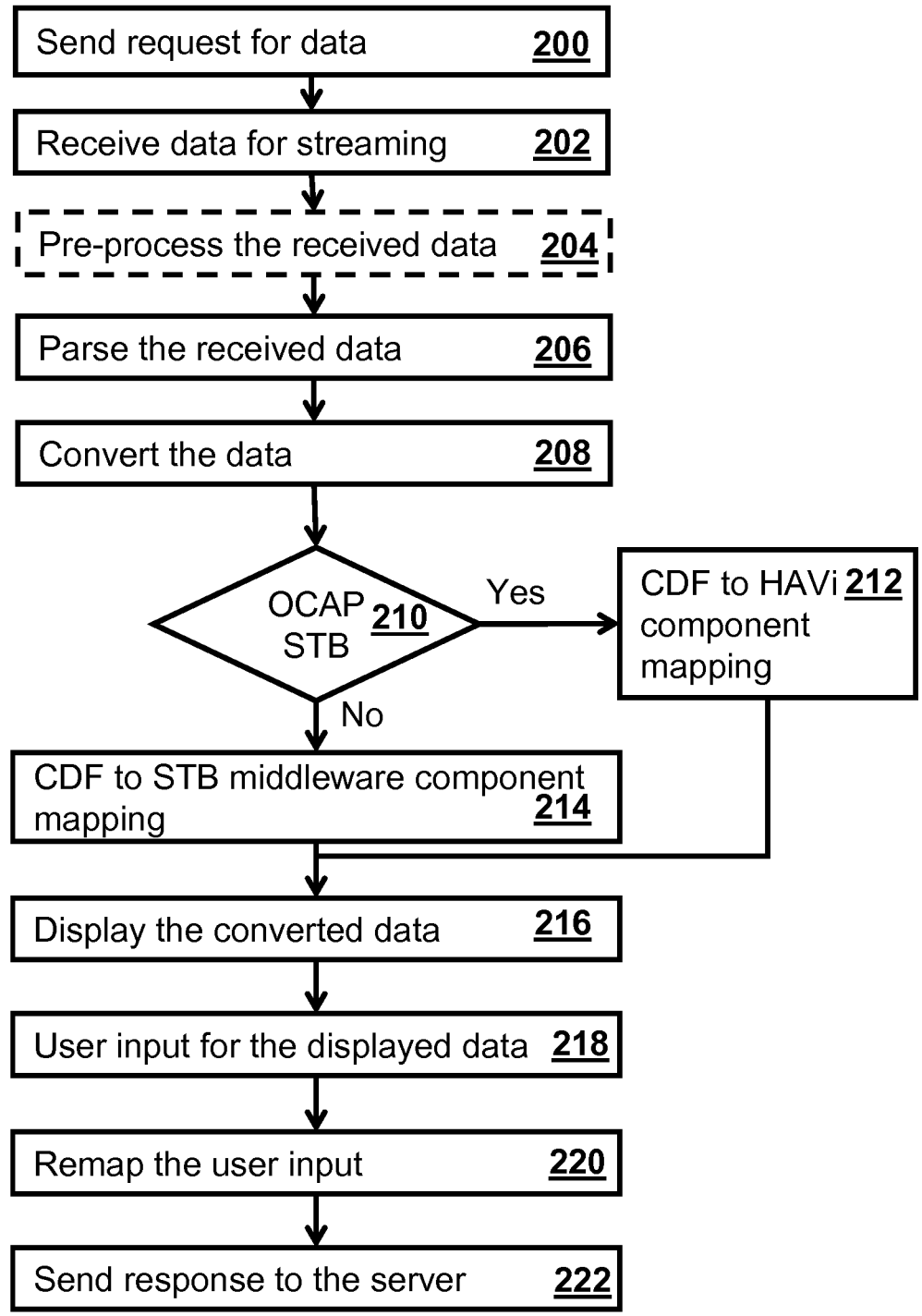
FIG. 2 is a flow diagram illustrating a method for rendering an application in a set-top box (STB), according to one embodiment of the invention.

FIG. 2 explains process flow in one embodiment of the invention. At step 200, a request for data is sent to a server, such as server 102. At step 202, a network device, such as network device 106, receives the requested data from the server. At step 204, pre-processing of the data received from the server is performed to include any system specific rule-set and to optimize the data for parsing. In an embodiment, the data received from the server contains declaratives belonging to XHTML. At step 206, parsing is carried out to split the declaratives into respective components of XHTML. The components are converted into a common data format (CDF) at step 208. At step 210, it is checked whether the middleware used by the network device is defined in Open Cable Application Platform (OCAP). If the middleware is defined in OCAP, the data in the common data format is mapped into components of HAVi specification at step 212. However, if the network device does not use a middleware defined in OCAP, the data is mapped to components of the native STB at step 214. At step 216, the mapped components are displayed in a broadcasting-receiving apparatus, such as broadcasting-receiving apparatus 118. At step 218, the user input for the interface rendered in the broadcasting-receiving apparatus is received in the network device. In an embodiment of the present invention, the user input is at least one of binary and text depending upon the type of the input device possessed by the user. The user input is received by the network device and the data is re-mapped at step 220. The user response for the displayed interface is received at the network device. The received user input is again converted back to declaratives as received from the server. At step 222, the re-mapped data is sent to the server.

As used in this disclosure, the term 'native STB' refers to an STB that conforms to the standards mentioned by the specifications of the STB vendor. It should be noted that the above mentioned steps can be extended to any STB that follows middleware specifications such as MHP, EBIF and so forth.

Figure 3:
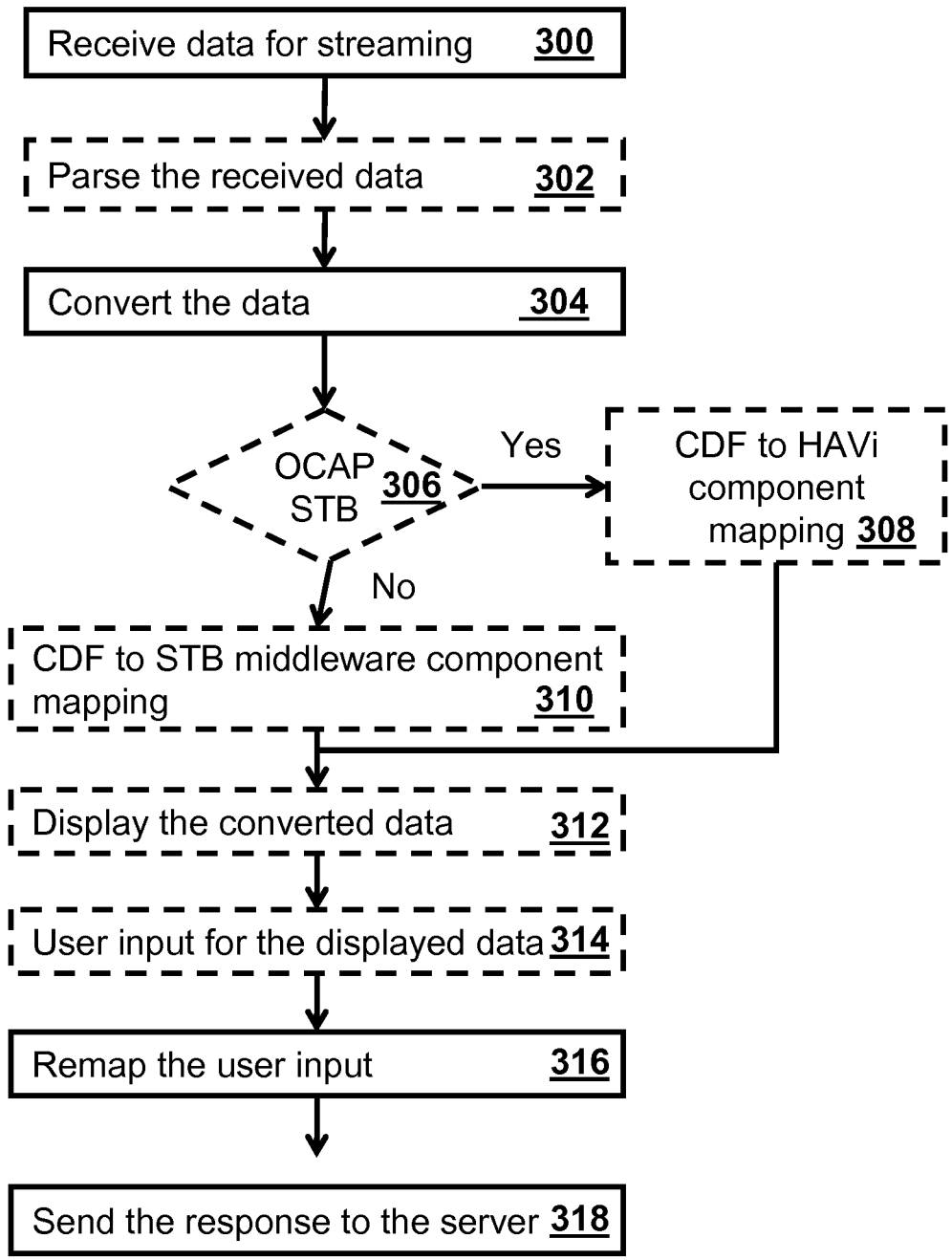
FIG. 3 is a flow diagram illustrating a method for rendering an application in a set-top box (STB), according to another embodiment of the invention.

FIG. 3 explains process flow in another embodiment of the invention. At step 300, a network device, such as network device 116, receives data from a server, such as server 102. In one embodiment of the present invention, the data received from the server contains declaratives belonging to XHTML. At step 302, parsing may be performed to split the declaratives into respective components of XHTML. The components are converted into a CDF at step 304. At step 306, it is checked whether the middleware used by the network device is defined in OCAP. If the middleware used by the network device is defined in OCAP, data from the common data format is mapped into components of HAVi specification at step 308. However, if the network device does not use a middleware defined in OCAP, the data in the common data format is mapped into components of native STB at step 310. At step 312, the mapped components may be displayed in a broadcasting-receiving apparatus, such as broadcasting-receiving apparatus 118. The user input for the interface rendered in the broadcasting-receiving apparatus may be received at the network device at step 314. In one embodiment of the present invention, the input received by the user input may be in either a binary or a text form depending upon the type of input device possessed by the user. At step 316, the user input is received by the network device and the data is re-mapped to the format received from the server. Finally, at step 318, the re-mapped data is sent to the server.

Figure 4:
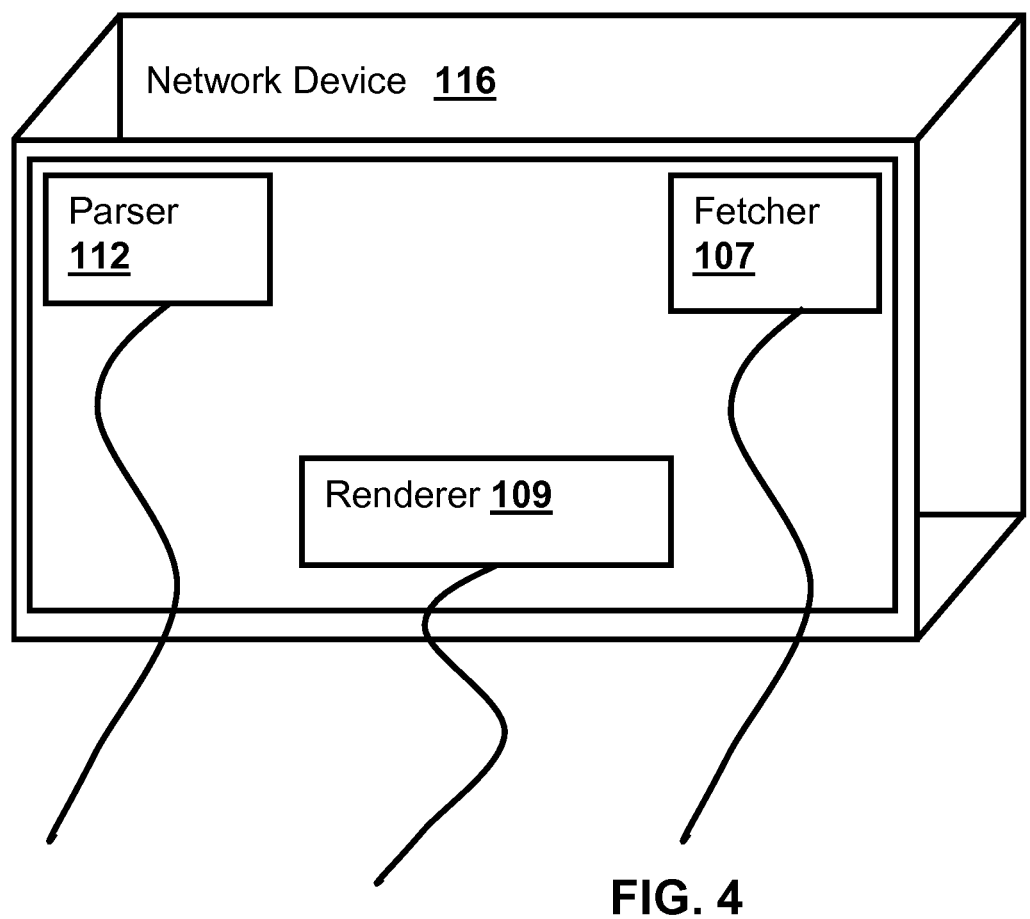
FIG. 4 is a block diagram illustrating different components of the multi-standard browser rendered in the network device, as per one embodiment of the invention.

FIG. 4 is a block diagram illustrating different components of the multi-standard browser rendered in network device 116, as per one embodiment of the invention. In one embodiment of the invention, the functionality of parser 112 is detailed, so that the data received from a component outside network device 116 is parsed and split into one or more components. In another embodiment of the present invention, the data can be provided from a device which is not part of the present system. In yet another embodiment of the present invention, the functionalities of at least one of a group comprising parser 112, renderer 109 and fetcher 107 may be exposed independently to other systems.

In one embodiment of the invention the functionality of a component navigator, such as component navigator 110 (not shown in the figure), is detailed so that the browser callback can be handled for another network device or a combination of two or more devices.

In one embodiment of the invention, an application programming interface (API), such as API 108 (not shown in the figure), is detailed to other devices so that a combination of functionalities of the parser and component navigator can be depicted to other devices.

In one embodiment of the present invention, the common data format is a collection of binary objects.

Exemplary Computing Environment

Figure 5:
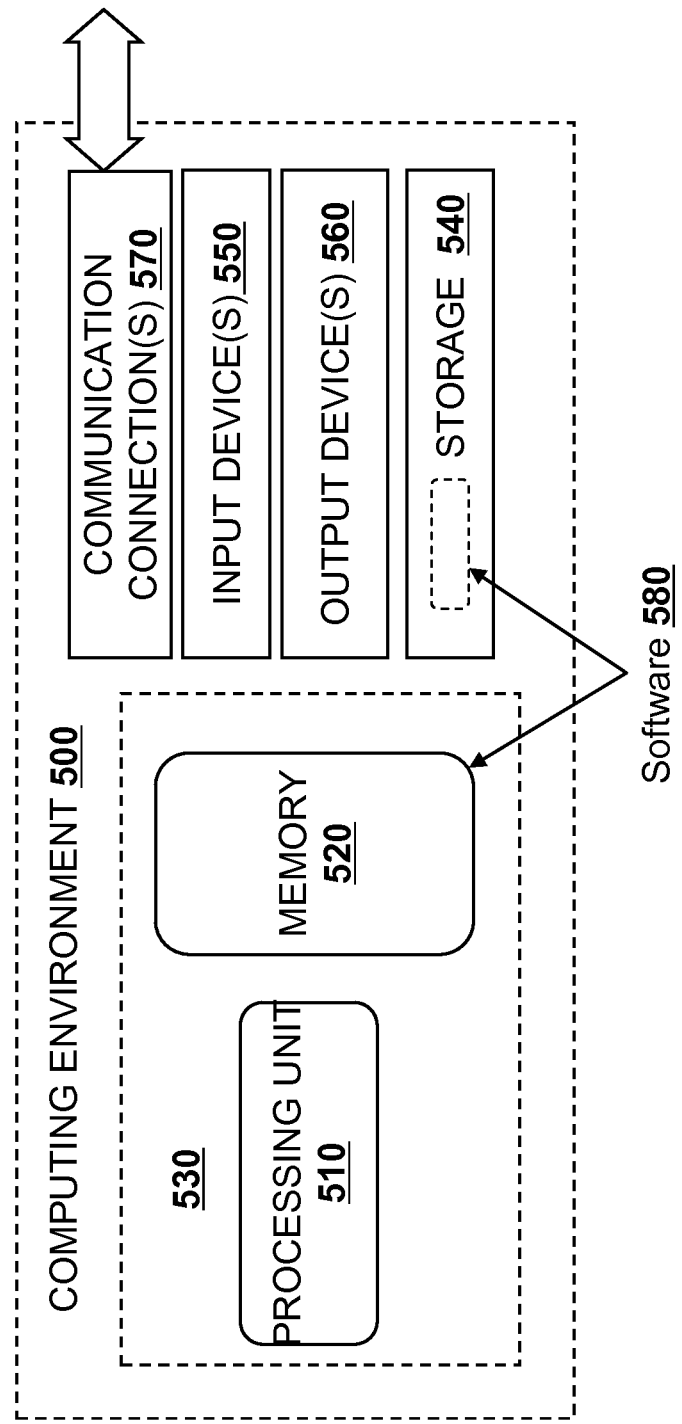
FIG. 5 is a system illustrating a generalized computer network arrangement, in one embodiment of the present technique.

One or more of the above-described techniques can be implemented in or involve one or more computer systems. FIG. 5 illustrates a generalized example of a computing environment 500. The computing environment 500 is not intended to suggest any limitation as to scope of use or functionality of described embodiments.

With reference to FIG. 5, the computing environment 500 includes at least one processing unit 510 and memory 520. The processing unit 510 executes computer-executable instructions and may be a real or a virtual processor. In a multi-processing system, multiple processing units execute computer-executable instructions to increase processing power. The memory 520 may be volatile memory (e.g., registers, cache, RAM), non-volatile memory (e.g., ROM, EEPROM, flash memory, etc.), or some combination of the two. In some embodiments, the memory 520 stores software 580 implementing described techniques.

A computing environment may have additional features. For example, the computing environment 500 includes storage 540, one or more input devices 550, one or more output devices 560, and one or more communication connections 570. An interconnection mechanism (not shown) such as a bus, controller, or network interconnects the components of the computing environment 500. Typically, operating system software (not shown) provides an operating environment for other software executing in the computing environment 500, and coordinates activities of the components of the computing environment 500.

The storage 540 may be removable or non-removable, and includes magnetic disks, magnetic tapes or cassettes, CD-ROMs, CD-RWs, DVDs, or any other medium which can be used to store information and which can be accessed within the computing environment 500. In some embodiments, the storage 540 stores instructions for the software 580.

The input device(s) 550 may be a touch input device such as a keyboard, mouse, pen, trackball, touch screen, or game controller, a voice input device, a scanning device, a digital camera, or another device that provides input to the computing environment 500. The output device(s) 560 may be a display, printer, speaker, or another device that provides output from the computing environment 500.

The communication connection(s) 570 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 500, computer-readable media include memory 520, storage 540, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

The invention claimed is:

1. A system for streaming data in a network device, the system comprising:
   the network device for receiving at least one declarative from a server;
   an application programming interface (API) for processing the received at least one declarative;
   a broadcasting-receiving apparatus for rendering a user interface;
   an event processor for mapping data in a common data format to either (i) Home Audio Video Interoperatility (HAVi) protocol if middleware is defined in Open Cable Application Platform (OCAP) or (ii) native set-top box (STB) protocol if the network device does not use middleware defined in OCAP; and a component navigator for navigating between components of the rendered user interface.

2. The system of claim 1, wherein the network device is at least one of STB, Personal Digital Assistant (PDA), Set-Top Unit (STU), Satellite Receiver and Network Interface Unit (NIU).

3. The system of claim 1, wherein the middleware used in the network device is defined in one of an OCAP standard and a Multimedia Home Platform (MHP) standard.

4. The system of claim 1, wherein the broadcasting-receiving apparatus is at least one of television (TV), Personal Digital Assistant (PDA), tablet and telephone.

5. The system of claim 1, wherein the network device and the broadcasting-receiving apparatus are the same.

6. The system of claim 1, further comprising a fetcher for sending a request for data to the server through a network.

7. The system of claim 1, further comprising a parser for splitting the at least one declarative into components of Extensible Hypertext Markup Language (XHTML).

8. The system of claim 7, wherein parsing involves at least one of preprocessing and query optimization.

9. The system of claim 1, wherein the common data format is a collection of binary objects.

10. The system of claim 1, wherein the at least one declarative is defined in at least one of HTML, XHTML, CSS, JavaScript and Enhanced Binary Interchange Format (EBIF).

11. The system of claim 1, wherein the mapped data is displayed in the broadcasting-receiving apparatus.

12. The system of claim 11, wherein user input for the interface rendered in the broadcasting-receiving apparatus is received in the network device.

13. The system of claim 12, wherein the user input is in one of binary form and text form.

14. The system of claim 13, wherein data from the user input is re-mapped to a format received from the server and sent to the server.

* * * * *